US 6,694,017 B1

(12) United States Patent
Takada

(10) Patent No.: US 6,694,017 B1
(45) Date of Patent: Feb. 17, 2004

(54) AUTOMATIC GAIN CONTROL APPARATUS DETERMINING ECHO RETURN LOSS

(75) Inventor: Masashi Takada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/545,606

(22) Filed: Apr. 7, 2000

(30) Foreign Application Priority Data

Sep. 1, 1999 (JP) ............................. 11-247317

(51) Int. Cl.[7] ..................... H04M 1/00; H04M 9/00
(52) U.S. Cl. ................... 379/402; 379/404; 379/403
(58) Field of Search ................. 379/406.01, 406.08, 379/406.03, 406.07, 390.01, 387.01, 390.03, 390.04, 395, 402, 404, 406.05, 406.06; 370/286, 290; 455/570

(56) References Cited

U.S. PATENT DOCUMENTS

| RE31,253 E | * | 5/1983 | Weinstein ............... 379/399 |
| 4,751,730 A | * | 6/1988 | Galand et al. ........... 379/410 |
| 4,999,830 A | * | 3/1991 | Agazzi .................. 379/410 |
| 5,001,480 A | * | 3/1991 | Ferry et al. ............ 379/410 |
| 5,099,472 A | | 3/1992 | Townsend et al. |
| 5,177,734 A | * | 1/1993 | Cummiskey et al. ....... 379/410 |
| 5,181,198 A | * | 1/1993 | Lechleider ............. 379/410 |
| 5,875,246 A | | 2/1999 | Houghton |
| 5,896,420 A | * | 4/1999 | Kaku et al. ............ 375/285 |
| 5,951,626 A | * | 9/1999 | Duttweiler ............. 708/322 |
| 6,324,170 B1 | * | 11/2001 | McClennon et al. ...... 370/286 |
| 6,477,250 B1 | * | 11/2002 | Sheets ................. 379/404 |
| 6,563,803 B1 | * | 5/2003 | Lee .................... 370/290 |

FOREIGN PATENT DOCUMENTS

| EP | 0 765 067 A2 | 3/1997 |
| GB | 2 245 459 A | 1/1992 |
| JP | 06104970 | 4/1994 |
| JP | 06303168 | 10/1994 |

OTHER PUBLICATIONS

Hiroshi Yasukawa, "Two–Wire AGC Amplifiers with Echo Cancellers for Two–Way Voice Signals", Electronics & Communications in Japan, Part 1—Communications, Scripta Technica. New York, US, vol. 76, No. 11, Nov. 1, 1993, pp. 36–47.

* cited by examiner

Primary Examiner—Rexford Barnie
(74) Attorney, Agent, or Firm—Venable LLP; Michael A. Sartori; Jung (John) H. Kim

(57) ABSTRACT

An automatic gain control apparatus, employed in a communication system having a circuit that interfaces a two-wire line to a four-wire line, measures the echo return loss occurring at the interface, calculates a gain from the echo return loss, and amplifies an incoming signal on the four-wire line by the calculated gain before transmission through the interface, to compensate for the echo return loss. If the communication system uses an echo canceler to cancel the echo, the echo canceler is preferably shielded from the effects of automatic gain control, by attenuation of the outgoing signal on the four-wire line, for example.

18 Claims, 7 Drawing Sheets

AUTOMATIC GAIN CONTROL APPARATUS DETERMINING ECHO RETURN LOSS

BACKGROUND OF THE INVENTION

The present invention relates to an automatic gain control apparatus that compensates for transmission loss in a communication system such as a telephone communication system.

In many telephone communication systems, speech signals are transmitted in digital form within the switching apparatus of the system, and in analog form between the switching apparatus and the telephone sets to which the switching apparatus is connected. Automatic gain control (AGC) is used to compensate for various types of loss that occur in analog transmission.

One type of loss is an insertion loss caused by the two-wire analog line connecting a telephone set to the switching apparatus. Another type of loss is an echo return loss that occurs in the so-called hybrid circuit that interfaces the two-wire line to the four-wire line used in the switching apparatus. Both types of loss tend to vary from line to line and from call to call, and are difficult to predict in advance.

A known method of automatic gain control detects insertion loss on the two-wire line by measuring the amplitude or power level of the speech signal received from the telephone set, and amplifies the speech signal sent toward the telephone set by an amount sufficient to compensate for the detected insertion loss and an assumed echo return loss. The assumed echo return loss may be zero. The amplification is performed digitally, before the speech signal passes through the hybrid circuit. If line conditions vary during a call, the amplification factor or gain is adjusted to compensate for the variations.

One problem in this method is that the actual echo return loss may differ considerably from the assumed echo return loss. Consequently, the signal reaching the telephone set may have an undesirably high or low level.

Another problem is that the insertion loss cannot be detected until a speech signal is received from the telephone set. Until such a speech signal is received, the AGC apparatus operates at a default setting, e.g. with unity gain. In the worst case, when the insertion loss and echo return loss are both large, and the party at the other end of the communication link speaks at length before the party at the telephone set in question speaks at all, the latter party may have to listen to an extended interval of speech that is too faint to be heard easily.

A further problem is that by amplifying the speech signal supplied to the hybrid circuit, the AGC apparatus also amplifies the echo that returns from the hybrid circuit to the outgoing pair of wires in the four-wire line. Many telephone switching systems use echo cancelers to remove this unwanted echo. Each time the AGC apparatus adjusts its gain, the echo canceler must adjust to a new echo level. Echo-canceling performance is degraded during the adjustment period. Echo cancellation may even become impossible, if the echo canceler is implemented on a digital signal processor (DSP) of the type that performs fixed-point arithmetic, and the AGC apparatus amplifies the echo to a level higher than the maximum fixed-point output value of the DSP.

SUMMARY OF THE INVENTION

An object of the present invention is to provide an automatic gain control method and apparatus that take correct account of echo return loss in an interface between a four-wire line and a two-wire line.

Another object of the invention is to provide an automatic gain control method and apparatus that do not interfere with echo cancellation.

The invented automatic gain control method is applicable in a communication system having a circuit that interfaces a two-wire line to a four-wire line. The method comprises the steps of:

measuring the levels of an incoming signal on the incoming path of the four-wire line, and the echo of the incoming signal reflected by the interface circuit onto the outgoing path of the four-wire line, thereby determining the echo return loss;

calculating a gain from the echo return loss; and amplifying the incoming signal by the calculated gain before transmission through the interface circuit to the two-wire line, thereby compensating for the echo return loss.

As a further step, the outgoing signal on the outgoing path of the four-wire line may be attenuated to suppress the echo.

Alternatively, the communication system may have an echo canceler that generates an echo replica from the incoming signal and subtracts the echo replica from the outgoing signal. The invention provides several methods of shielding the echo canceler from the effects of automatic gain control, such as: attenuating the outgoing signal according to the gain applied to the incoming signal; amplifying the echo replica, and attenuating the outgoing signal for feedback to the echo canceler; or subtracting an amplified echo replica signal from an amplified outgoing signal for output to the far end of the communication link, and subtracting a non-amplified echo replica signal from a non-amplified outgoing signal for feedback to the echo canceler.

The invention also provides automatic gain control apparatus employing the above methods.

DETAILED DESCRIPTION OF THE INVENTION

Figure 1:
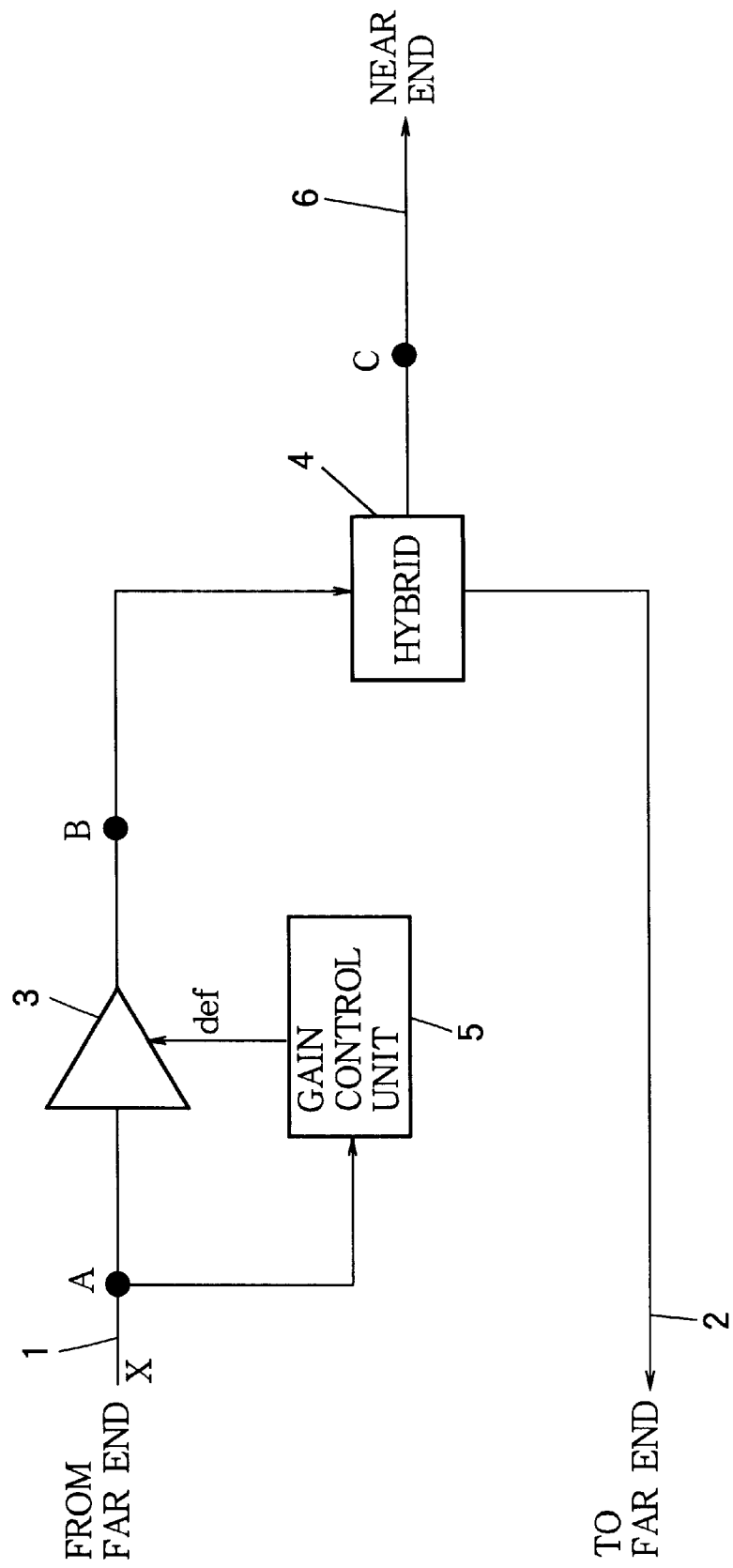
FIG. 1 is a block diagram of a conventional AGC apparatus.

Embodiments of the invention will be described with reference to the attached drawings, in which like parts are indicated by like reference characters.

For reference, FIG. 1 shows a simplified example of a conventional AGC apparatus designed for use in a private branch exchange. A four-wire line leading through the switching circuits of the exchange (not visible) toward the far end of the communication link has an incoming path 1 and an outgoing path 2, each shown as a single line but actually comprising a pair of wires. The incoming signal X on the incoming path 1 is amplified by an incoming AGC amplifier 3, and the amplified signal is supplied to a hybrid circuit 4. The amplifier gain is controlled by a gain control unit 5 that measures the power XP of the signal X at point A, before amplification, and determines the deficit (def) of the measured power XP with respect to a target power level P. The target power level P is determined from the power of a speech signal received from a telephone set (not visible) at the near end of the communication link.

For example, if the power XP measured at point A is minus sixteen decibels (−16 dBm0) and the target power level P is minus ten decibels (−10 dBm0), the deficit def is six decibels (6 dB). The incoming AGC amplifier 3 amplifies the power of the incoming signal X by this amount, substantially doubling the amplitude of the signal X.

The hybrid circuit 4, which will be referred to simply as the 'hybrid' below, is also coupled to the outgoing path 2, and to a bi-directional two-wire line 6 leading toward the near end of the communication link. If the hybrid 4 operated in an ideal manner, all of the signal power at point B would be transmitted to point C on the two-wire line 6. In practice, the signal power at point C is less than the power at point B, because of echo return loss; due to imperfect impedance matching between the hybrid 4 and the two-wire line 6, some of the signal power at point B is reflected onto the outgoing path 2 as an echo. The target power level P implicitly allows for an assumed amount of echo return loss, but as noted above, the assumed echo return loss may differ from the actual echo return loss.

Figure 2:
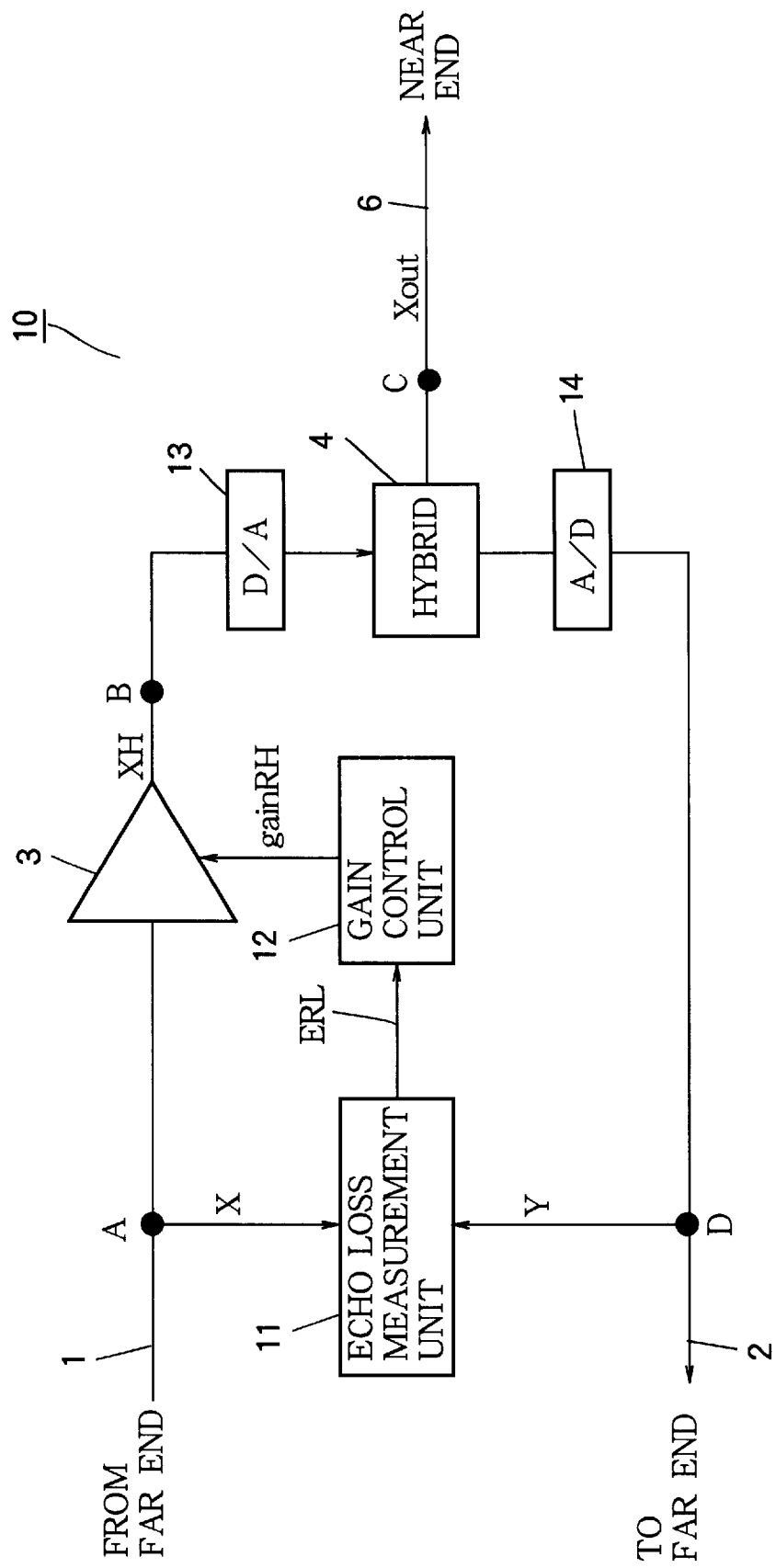
FIG. 2 is a block diagram of an AGC apparatus illustrating a first embodiment of the invention.

FIG. 2 illustrates a first embodiment 10 of the invention, showing the above-described incoming path 1, outgoing path 2, incoming AGC amplifier 3, hybrid 4, and two-wire line 6, as well as an echo loss measurement unit 11, a gain control unit 12, a digital-to-analog (D/A) converter 13, and an analog-to-digital (A/D) converter 14. The incoming signal X is a digital signal, and the incoming path 1, outgoing path 2, incoming AGC amplifier 3, echo loss measurement unit 11, and gain control unit 12 comprise digital circuits. The D/A converter 13 converts the signal XH output from the AGC amplifier 3 to analog form for input to the hybrid 4. The A/D converter 14 converts the analog signal received from the hybrid 4 to a digital outgoing signal Y for transmission on the outgoing path 2. The D/A converter 13 and A/D converter 14 are conventional devices, which were omitted from FIG. 1 for simplicity.

The echo loss measurement unit 11 receives the incoming signal X from a point A on the incoming path 1 and the outgoing signal Y from a point D on the outgoing path 2, calculates the echo return loss ERL by comparing X and Y, and supplies the calculated ERL value to the gain control unit 12.

The gain control unit 12 uses the supplied ERL value to determine the proportion of the incoming signal that is transmitted through the hybrid 4 and reaches point C on the two-wire line 6, calculates a gain setting gainRH that will bring the signal at point C to a desired level, and supplies this setting gainRH to the incoming AGC amplifier 3.

Details of the calculation of ERL and gainRH will be given in the description of the operation of the first embodiment 10, which follows next.

The incoming signal X received from the far end is supplied to both the echo loss measurement unit 11 and the AGC amplifier 3. The AGC amplifier 3 is initially set to unity gain and does not amplify the incoming signal X. After digital-to-analog conversion by the D/A converter 13 and passage through the hybrid 4, the incoming signal, now denoted Xout, is sent toward the near-end party on the two-wire line 6, passing through point C. Part of the incoming signal is reflected by the hybrid 4, becoming an echo signal. The returning echo is converted back to digital form by the A/D converter 14, and received by the echo loss measurement unit 11 as part of the outgoing signal Y. At a time when the near-end party is not speaking, the outgoing signal Y consists almost entirely of the returning echo.

At such a time, the echo loss measurement unit 11 calculates the echo return loss ERL according to the following equation, $$ERL = \frac{\sum_{i=1}^{m} |Y_i|}{\sum_{i}^{m} |X_i|}$$

in which m is a positive integer, and Xi and Yi denote the m most recent samples of the incoming and outgoing signals, respectively. An ERL value of 0.5, for example, indicates that the outgoing signal Y has half the amplitude level of the incoming signal X. If it is assumed, for simplicity, that the amplitude at point B is the sum of the amplitudes at points C and D, this means that the amplitude at point C is also only half the amplitude at point B.

An initial target level of the power of the signal Xout placed on the two-wire line 6 at point C is preset in the gain control unit 12. The gain control unit 12 compares this target level with the power of the incoming signal at point A and determines a power deficit def. If the power at point A is −16 dBm0 and the target level is −10 dBm0, for example, the power deficit def is 6 dB.

$$def = (-10) - (-16) = 6$$

The power of the incoming signal X is calculated by the echo loss measurement unit 11 by, for example, squaring the amplitude of X, which is calculated in the determination of the return loss ERL.

Having determined the power deficit def, the gain control unit 12 determines the gain needed to raise the power of the incoming signal X to the target level. In the example above, this gain (gainR) is calculated as follows.

$$gainR = 10^{6/20}$$

Next, the gain control unit 12 determines a further gain that will compensate for the echo return loss ERL at the hybrid 4. This further gain (gainH) is calculated as follows.

$$gainH = 1/(1 - ERL)$$

The gain control unit 12 then multiplies the two calculated gains gainR and gainH together to obtain the gain value (gainRH) supplied to the incoming AGC amplifier 3.

$$gainRH = gainR \cdot gainH$$

If the echo return loss ERL is 0.5 and the power deficit def is six decibels as described above, then gainH is equal to two, gainR is substantially equal to two, and gainRH is substantially equal to four.

The AGC amplifier 3 multiplies the values of the incoming digital signal X by the supplied value of gainRH to obtain the signal XH.

$$XH = X \cdot gainRH = X \cdot gainR \cdot gainH = X \cdot gainR/(1 - ERL)$$

After passing through the D/A converter 13 and hybrid 4, the signal Xout has the desired target level (X·gainR) at point C, as shown by the following calculations.

$$X\text{out}=XH\cdot(1-ERL)=\{X\cdot\text{gain}R/(1-ERL)\}\cdot(1\cdot ERL)=X\cdot\text{gain}R$$

The first embodiment 10 accordingly provides an AGC apparatus that determines the actual echo return loss in the hybrid 4 and compensates for this loss correctly, even if the loss is unexpectedly high or low.

A particular advantage of the first embodiment is that compensation for echo return loss begins substantially as soon as the far-end party starts speaking. An unexpectedly high echo return loss, combined with a high insertion loss on the two-wire line 6, does not lead to an extremely faint received signal at the near end during the interval before the near-end party speaks.

Next, a second embodiment will be described.

Figure 3:
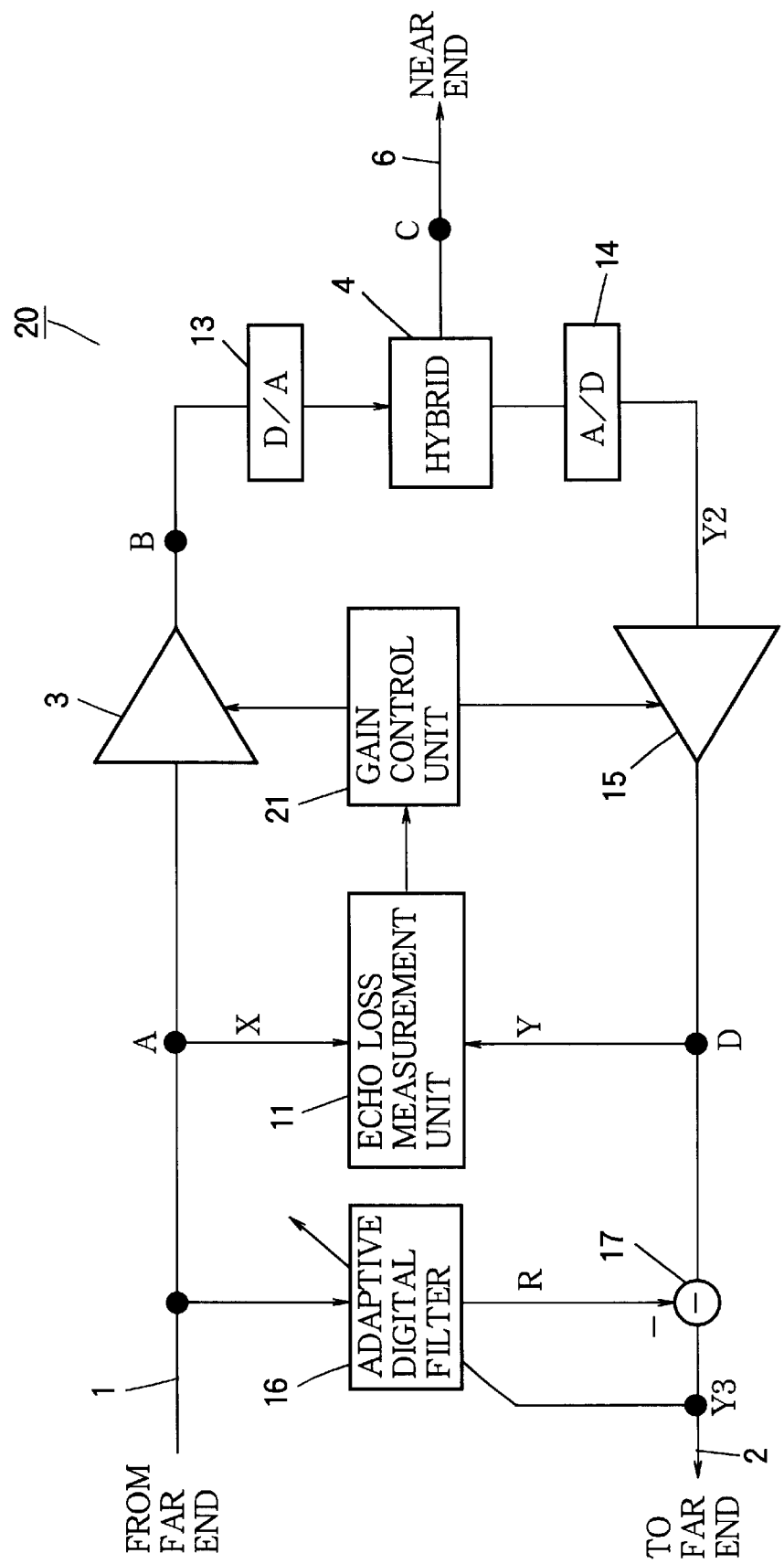
FIG. 3 is a block diagram of an AGC apparatus illustrating a second embodiment.

Referring to FIG. 3, the second embodiment 20 adds an outgoing AGC amplifier 15, an adaptive digital filter 16, and a subtractor 17 to the configuration of the first embodiment, and alters the operation of the gain control unit 21. The adaptive digital filter 16 and subtractor 17 constitute an echo canceler.

The outgoing AGC amplifier 15 is inserted in the outgoing path 2 to amplify the output of the A/D converter 14. The gain of the outgoing AGC amplifier 15 is controlled by the gain control unit 21 as explained below. The letter Y now denotes the output of the outgoing AGC amplifier 15, while Y2 denotes the output of the A/D converter 14. The amplifier output signal Y, instead of the A/D output signal Y2, is supplied to the echo loss measurement unit 11. The outgoing signal sent to the far end is denoted Y3.

The adaptive digital filter 16 receives the incoming signal X before it is amplified by the incoming AGC amplifier 3, and generates an echo replica signal R by convolving the incoming signal X with a set of tap coefficients. The tap coefficients are updated on the basis of feedback of the outgoing signal Y3 as a residual signal. The updating is carried out according to a well-known algorithm such as the least mean square (LMS) algorithm, or the normalized least mean square (NLMS) algorithm, which attempts to minimize the power of the outgoing signal Y3 when the far-end party is speaking and the near-end party is not speaking. The adaptive digital filter 16 includes a double-talk detector that halts the updating process when both parties are speaking. Updating is also halted when only the near-end party is speaking.

The subtractor 17 subtracts the echo replica signal R from the amplifier output signal Y to obtain the outgoing signal Y3.

The gain control unit 21 controls the gain of both AGC amplifiers 3, 15.

Next, the operation of the second embodiment 20 will be described.

Initially, the two AGC amplifiers 3, 15 are both set to unity gain. The gain control unit 21 calculates gainR, gainH, and gainRH as described in the first embodiment. Thereafter, the gain control unit 21 supplies the calculated value of gainRH to the incoming AGC amplifier 3, and the reciprocal of this value (1/gainRH) to the outgoing AGC amplifier 15. The incoming signal X is multiplied by gainRH as described in the first embodiment.

When only the far-end party is speaking, the signal Y2 output by the A/D converter 14 can be expressed as follows.

$$Y2=X\cdot\text{gain}RH\cdot ERL$$

The outgoing AGC amplifier 15 multiplies the output Y2 of the A/D converter 14 by the reciprocal gain (1/gainRH), so that Y2 is divided by gainRH. The echo signal Y output by the outgoing AGC amplifier 15 can be expressed as follows.

$$Y=Y2/\text{gain}RH=X\cdot\text{gain}RH\cdot ERL/\text{gain}RH=X\cdot ERL$$

This is exactly the value of the outgoing echo signal that would be supplied to the subtractor 17 if the two AGC amplifiers 3, 15 were not present.

The adaptive digital filter 16 therefore functions as if automatic gain control were not in operation. If the gain control unit 21 changes the gain of the AGC amplifiers 3, 15 to cope with varying line conditions, the adaptive digital filter 16 is unaware of the change and does not have to adjust its tap coefficients to compensate. One benefit of the second embodiment is, thus, that echo-canceling performance is not degraded by variations in the gain of the incoming AGC amplifier 3, because these variations are nullified by the outgoing AGC amplifier 15.

Another benefit if the second embodiment is that the echo canceler can be implemented on a fixed-point DSP without risk that the echo canceler will be unable to generate and subtract an echo replica R large enough to cancel all of the echo.

Without the outgoing AGC amplifier 15, the echo canceler would have to cancel an echo amplified by a factor of gainRH, which is always greater than unity, as shown by the following inequalities.

$$\text{gain}R\geq 1$$

$$1/(1-ERL)>1$$

$$\text{gain}RH=\text{gain}R\cdot\text{gain}H=\text{gain}R/(1\cdot ERL)>1$$

$$Y2=X\cdot\text{gain}RH\cdot ERL>X\cdot ERL$$

If the adaptive digital filter 16 and subtractor 17 were to be implemented on a fixed-point DSP, then when a large echo return loss forced the use of a large gainRH, the amplified echo Y2 might exceed the level of the incoming signal X, and might exceed the maximum value that could be output from the adaptive digital filter 16. By attenuating the echo, the outgoing AGC amplifier 15 in the second embodiment substantially eliminates this occurrence.

The second embodiment accordingly provides the effects of the first embodiment, with the further effects of improved echo-canceling performance and the ability to use a relatively inexpensive fixed-point DSP for echo canceling.

In a variation of the second embodiment, the gain control unit 21 sets the gain of the outgoing AGC amplifier 15 to E/gainRH, where E is a fixed constant other than unity, so that the gain of the outgoing AGC amplifier 15 is inversely proportional to the gain of the incoming AGC amplifier 3. The echo component of the outgoing signal is thereby multiplied by a factor of E, but this factor does not change, even if gainRH changes. Similar effects are obtained.

In another variation of the second embodiment, the gain control unit 21 sets the outgoing AGC amplifier 15 to unity gain when the near-end party is speaking and the far-end party is not speaking, to avoid attenuating the near-end party's speech signal.

Next, a third embodiment will be described.

Figure 4:
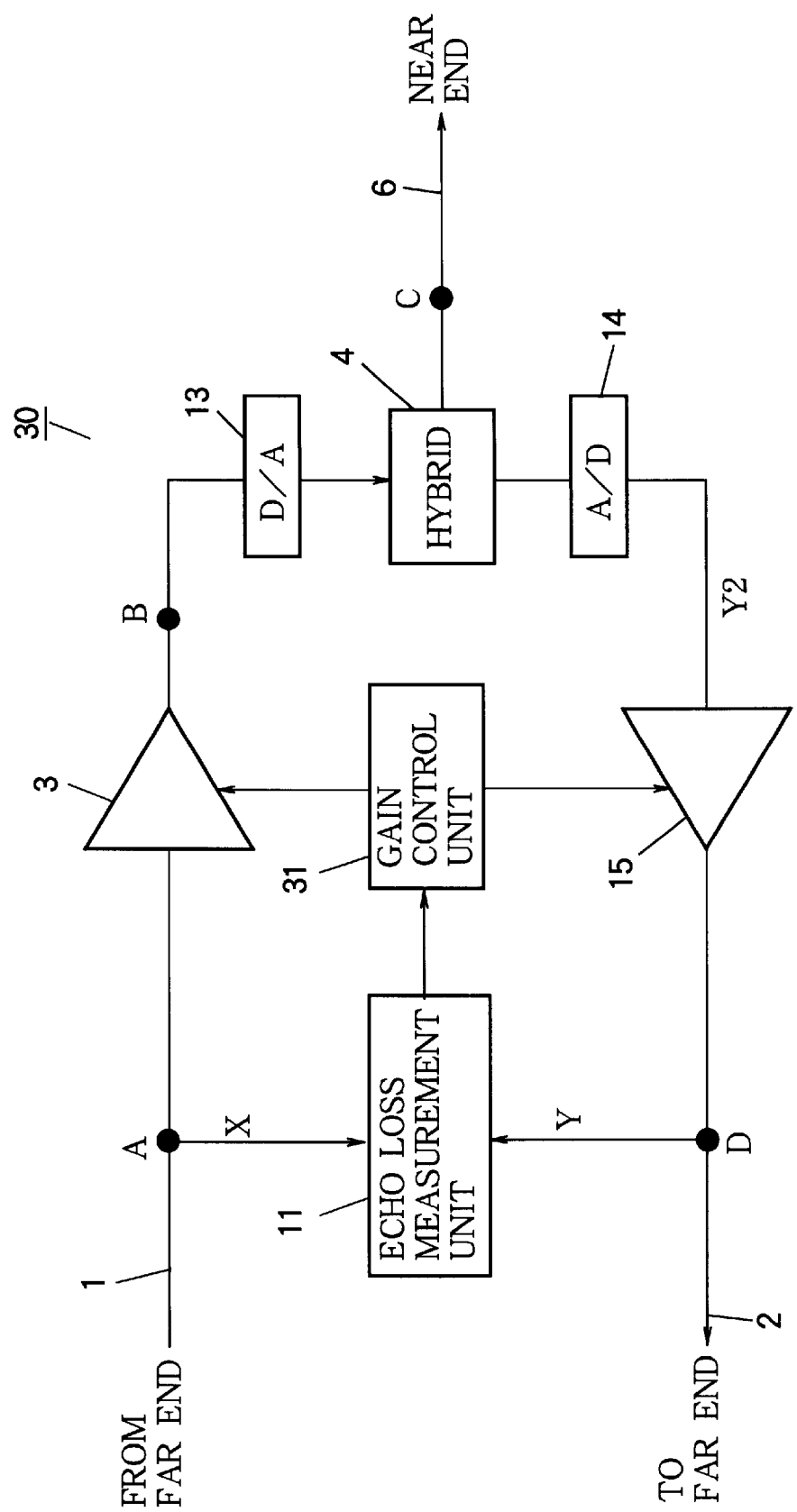
FIG. 4 is a block diagram of an AGC apparatus illustrating a third embodiment.

Referring to FIG. 4, the third embodiment 30 adds an outgoing AGC amplifier 15 to the configuration of the first embodiment, and alters the operation of the gain control unit 31.

The gain control unit 31 controls the gain of the incoming AGC amplifier 3 as described in the first embodiment. In addition, the gain control unit 31 adjusts the gain of the outgoing AGC amplifier 15 so that the echo component of the signal Y output by the outgoing AGC amplifier 15 exhibits a predetermined return loss such as, for example forty decibels (40 dB). That is, the amplitude of the outgoing echo is only one percent (1/100) of the amplitude of the incoming signal X. If this predetermined value is denoted ERL1, then after calculating the gain (gainRH) of the incoming AGC amplifier 3, the gain control unit 31 calculates the gain L1 of the outgoing AGC amplifier 15 as follows:

$$L1=ERL1/(gainRH \cdot ERL)$$

When only the far-end party is speaking, the outgoing signal Y is an echo signal that can be expressed as follows.

$$Y=Y2L1=XgainRH \cdot ERL \cdot L1=X \cdot ERL1$$

The outgoing AGC amplifier 15 thus functions as an echo suppressor, reducing the echo signal to an acceptably low level.

The third embodiment provides the same effects as the first embodiment, with an additional echo-suppression effect.

While the echo suppression in the third embodiment may be less effective than the echo cancellation in the second embodiment, compared with the second embodiment, the third embodiment has a much simpler configuration, since it does not require an adaptive digital filter.

In a variation of the third embodiment, the gain control unit 31 also detects the presence or absence of a near-end speech signal, and sets the outgoing AGC amplifier 15 to unity gain when near-end speech is present, to avoid attenuating the near-end speech signal sent to the far-end party. Preferably, the gain control unit 31 also detects the double-talk state, in which both parties speak at once, and sets the outgoing AGC amplifier 15 to unity gain only when the near-end party is speaking and the far-end party is not speaking.

Next, a fourth embodiment will be described.

Figure 5:
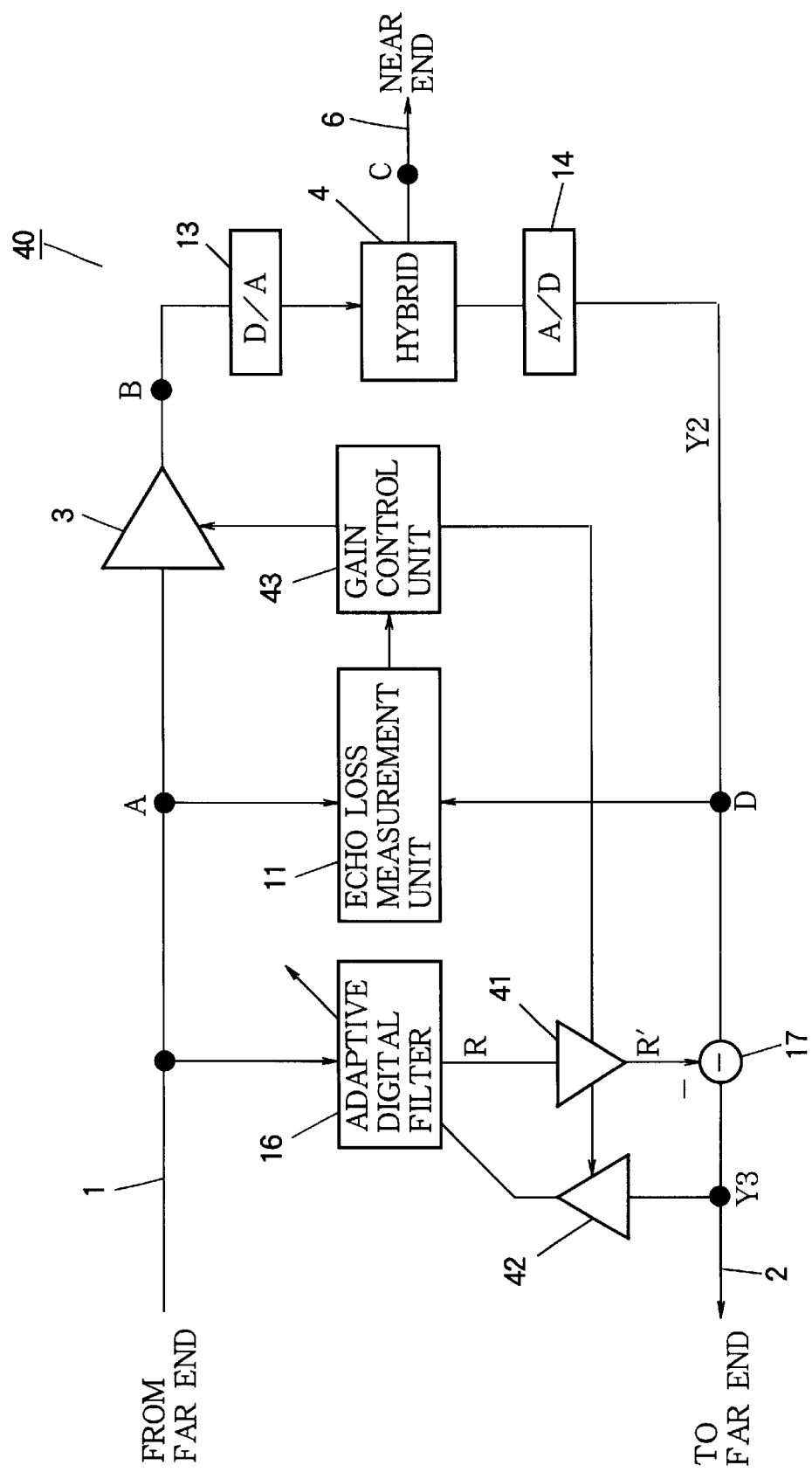
FIG. 5 is a block diagram of an AGC apparatus illustrating a fourth embodiment.

Referring to FIG. 5, the fourth embodiment 40 replaces the outgoing AGC amplifier 15 of the second embodiment 20 with an echo-replica AGC amplifier 41 and a feedback AGC amplifier 42, and further modifies the operation of the gain control unit 43.

The echo-replica AGC amplifier 41 is inserted between the adaptive digital filter 16 and subtractor 17, and amplifies the echo replica signal R output by the adaptive digital filter 16. The subtractor 17 subtracts the amplified echo replica signal R' from the outgoing signal Y2.

The feedback AGC amplifier 42 is also inserted between the adaptive digital filter 16 and subtractor 17, and attenuates the outgoing signal Y3 fed back from the subtractor 17 to the adaptive digital filter 16.

The gain control unit 43 calculates the gain (gainRH) of the incoming AGC amplifier 3 as described in the first embodiment, sets the echo-replica AGC amplifier 41 to the same gain value (gainRH), and sets the feedback AGC amplifier 42 to the reciprocal of this gain value (1/gainRH).

In regard to the incoming signal X, the fourth embodiment operates in the same way as the first embodiment.

In regard to echo cancellation, the fourth embodiment operates in essentially the same way as the second embodiment, making the adaptive digital filter 16 unaware of the amplification carried out by the incoming AGC amplifier 3. The echo component of the outgoing signal Y2 output by the A/D converter 14 is amplified by the factor gainRH, as described in the second embodiment.

$$Y2=X \cdot gainRH \cdot ERL$$

The feedback signal or residual signal returned to the adaptive digital filter 16 from the feedback AGC amplifier 42 is attenuated by the same factor gainRH, however. As in the second embodiment, the adaptive digital filter 16 receives the same input signals as it would if none of the AGC amplifiers were present, and generates an echo replica signal R substantially equal to X·ERL.

$$R=X \cdot ERL$$

This echo replica is inadequate, by a factor of gainRH, to cancel the echo in the outgoing signal Y2. Since the echo-replica AGC amplifier 41 multiplies R by gainRH, however, the echo replica signal R' subtracted by the subtractor 17 has substantially the following value $$R'R \cdot gainRH=X \cdot ERL \cdot gainRH=X \cdot gainRH \cdot ERL$$

This is precisely the value of the echo component in the outgoing signal Y2.

Regarding the incoming signal X, the fourth embodiment provides the same effects as the first embodiment.

Regarding echo cancellation, as in the second embodiment, the fourth embodiment shields the adaptive digital filter 16 from the deleterious effects of variable amplifier gain, and permits the use of a relatively inexpensive fixed-point DSP for the adaptive digital filter 16.

Compared with the second embodiment, the fourth embodiment has the further advantage of not attenuating the outgoing signal Y3 sent to the far end.

The fourth embodiment is more complex than the second embodiment, in that it has three AGC amplifiers instead of two, and in that the output bit width of the echo-replica AGC amplifier 41, the input bit width of the feedback AGC amplifier 42, and the bit width of the subtractor 17 must match the output bit width of the A/D converter 14, which may exceed the output bit width of the adaptive digital filter 16. The added complexity is modest, however, because the subtractor 17, echo-replica AGC amplifier 41, and feedback AGC amplifier 42 perform relatively simple arithmetic operations.

In a variation of the fourth embodiment, the gain control unit 43 sets the echo-replica AGC amplifier 41 to a gain proportional to gainRH, and the feedback AGC amplifier 42 to a gain inversely proportional to gainRH, with arbitrary fixed constants of proportionality. For example, the gain control unit 43 sets the gain of the echo-replica AGC amplifier 41 to E·gainRH and the gain of the feedback AGC amplifier 42 to 1/(E·gainRH), where E is a fixed constant other than unity. Similar effects are obtained.

Next, a fifth embodiment will be described.

Figure 6:
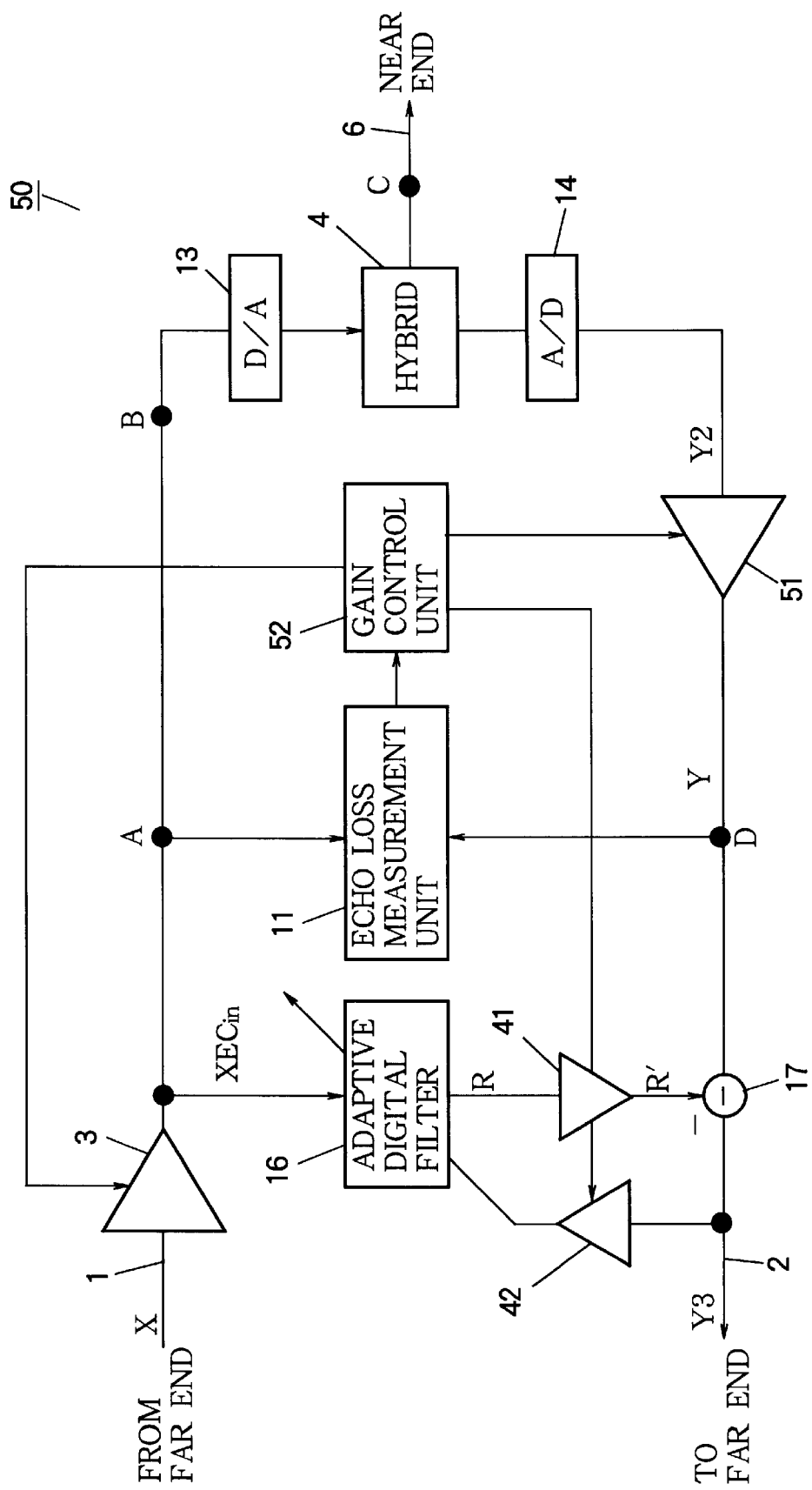
FIG. 6 is a block diagram of an AGC apparatus illustrating a fifth embodiment.

Referring to FIG. 6, the fifth embodiment 50 adds an outgoing AGC amplifier 51 to the configuration of the fourth embodiment 40, alters the operation of the gain control unit 52, and changes the location of the incoming AGC amplifier 3 so that the echo loss measurement unit 11 and adaptive digital filter 16 receive the incoming signal after amplification by the incoming AGC amplifier 3. The echo loss measurement unit 11 and subtractor 17 receive the outgoing signal Y output by the outgoing AGC amplifier 51, instead of the signal Y2 output by the A/D converter 14.

The gain control unit 52 calculates the gain of the AGC amplifiers 3, 41, 42, 51.

Next, the operation of the fifth embodiment will be described, under the assumption that the far-end party speaks first.

Initially, all of the AGC amplifiers 3, 41, 42, 51 are set to unity gain, while the gain control unit 52 calculates the gain value (gainRH) to be supplied to the incoming AGC amplifier 3 as described in the first embodiment.

The incoming AGC amplifier 3 now begins to amplify the incoming signal X by the supplied gain value (gainRH). The adaptive digital filter 16 receives an input signal XECin with the following amplified value.

$$XECin = X \cdot gainRH = X \cdot gainR \cdot gainH$$

The other AGC amplifiers 41, 42, 51 continue to operate with unity gain for the time being, so the adaptive digital filter 16 generates an echo replica signal R with substantially the following value.

$$R = XECin \cdot ERL = X \cdot gainR \cdot gainH \cdot ERL$$

The echo-replica AGC amplifier 41 outputs an echo replica signal R' identical to R. The subtractor 17 subtracts this echo replica signal R' from the outgoing signal Y to generate an outgoing signal Y3 that is substantially free of echo.

When the far-end party stops speaking and the near-end party begins speaking, the echo loss measurement unit 11 determines the power level LSin of the outgoing signal Y. A predetermined target power level LSin1 for this outgoing signal Y is set in the gain control unit 52. The gain control unit 52 compares the actual power level LSin with the target level LSin1, and determines an outgoing power deficit defSin as follows.

$$defSin = LSin1 - LSin$$

The gain control unit 52 then calculates a gain value (gain_s) that will compensate for the outgoing power deficit defSin, supplies this gain value (gain_s) to the outgoing AGC amplifier 51 and the echo-replica AGC amplifier 41, and sets the gain of the feedback AGC amplifier 42 to the reciprocal of this value (1/gain_s). The outgoing speech signal Y3 sent to the far end now has the target power level LSin1.

Thereafter, the AGC amplifiers continue to operate at the gain values set by the gain control unit 52, regardless of which party is speaking. During periods when only the far-end party is speaking, the signal Y output from the outgoing AGC amplifier 51 is an echo signal with the following value.

$$Y = X \cdot gainRH \cdot ERL \cdot gain\_s = X \cdot gainR \cdot gainH \cdot ERL \cdot gain\_s$$

Since the outgoing AGC amplifier 51 and feedback AGC amplifier 42 have mutually reciprocal gains, the adaptive digital filter 16 continues to operate as if both gains were unity, generating an echo replica signal R with the value given above. The echo-replica AGC amplifier 41 multiplies this echo replica signal by gain_s, however, to obtain an amplified echo replica signal R' with substantially the following value.

$$R' = X \cdot gainR \cdot gainH \cdot ERL \cdot gain\_s$$

This is the same as the value of the echo component in the outgoing signal Y, so the outgoing signal Y3 sent to the far end continues to be substantially free of echo.

The fifth embodiment 50 has the same effects as the fourth embodiment 40, with the further effect of enabling the outgoing signal Y to be amplified to a desired level without adverse effects on echo-canceling operations.

In a variation of the fifth embodiment, the gain control unit 52 sets the echo-replica AGC amplifier 41 to a gain proportional to gain_s, and the feedback AGC amplifier 42 to a gain inversely proportional to gain_s, with arbitrary fixed constants of proportionality. For example, the gain control unit 52 sets the gain of the echo-replica AGC amplifier 41 to E·gain_s and the gain of the feedback AGC amplifier 42 to 1/(E·gain_s), where E is a fixed constant other than unity. Similar effects are obtained.

Next, a sixth embodiment will be described.

Figure 7:
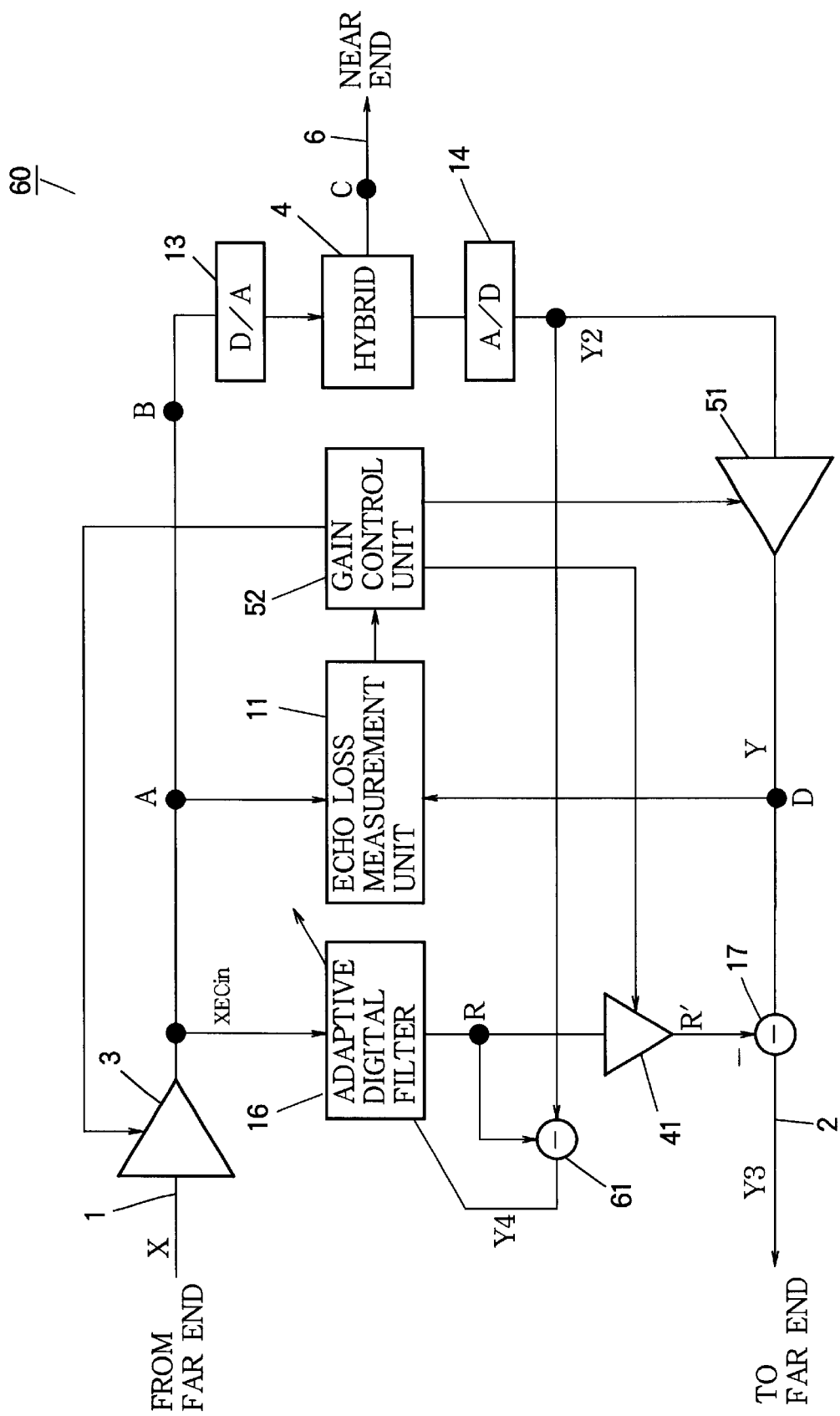
FIG. 7 is a block diagram of an AGC apparatus illustrating a sixth embodiment.

Referring to FIG. 7, the sixth embodiment 60 replaces the feedback AGC amplifier 42 of the fifth embodiment 50 with a second subtractor 61. The second subtractor 61 receives the output Y2 of the A/D converter 14, subtracts the echo replica signal R output from the adaptive digital filter 16, and feeds the difference Y4 back to the adaptive digital filter 16 for use in the updating of the tap coefficients. Aside from these differences, the sixth embodiment 60 has the same configuration as the fifth embodiment 50.

The feedback signal Y4 received by the adaptive digital filter 16 in the sixth embodiment has the following value.

$$Y4 = X \cdot gainRH \cdot ERL - R$$

This value matches the value of the attenuated feedback signal input to the adaptive digital filter 16 in the fifth embodiment. Since the adaptive filter 16 thus receives the same inputs as in the fifth embodiment, it generates the same echo replica signal R, and the amplified echo replica signal R' also has the same value as in the fifth embodiment.

In short, the sixth embodiment operates in the same way as the fifth embodiment regarding both amplification of the incoming signal by the factor gainRH, amplification of the outgoing signal by the factor gain_s, and echo cancellation in the outgoing signal.

The sixth embodiment 60 provides the same effects as the fifth embodiment 50, but is less complex, the subtraction operation performed by the subtractor 61 being computationally simpler than the multiplication operation performed by the feedback AGC amplifier in the fifth embodiment.

The invention is not restricted to the preceding embodiments. For example, the echo canceler can be modified so as to add the echo replica signal to the outgoing signal, instead of subtracting it. The adaptive digital filter then generates an echo replica signal that is complementary to the echo component of the outgoing signal.

The echo loss measurement unit can calculate the echo return loss ERL as a ratio of power levels, instead of a ratio of amplitude levels. The gain control unit then calculates gainH from the square root of 1/(1−ERL).

The invention can be practiced in hardware or in software.

The automatic gain control apparatus in the preceding embodiments comprised digital circuits, but some or all of the digital AGC circuits can be replaced with analog AGC circuits.

Those skilled in the art will recognize that further variations are possible within the scope claimed below.

What is claimed is:

1. An automatic gain control method for use in a communication system having a bi-directional two-wire line, a four-wire line with an incoming path carrying an incoming signal and an outgoing path carrying an outgoing signal, and an interface circuit electrically coupling the two-wire line to the four-wire line, comprising the steps of:

(a) measuring respective levels of the incoming signal on the incoming path and an echo of the incoming signal reflected by the interface circuit onto the outgoing path, thereby determining an echo return loss;

(b) calculating a first gain from the echo return loss; and (c) amplifying the incoming signal by the first gain before transmission through the interface circuit to the two-wire line, thereby compensating for the echo return loss, so that the incoming signal reaching the two-wire line has a desired level.

2. The automatic gain control method of claim 1, further comprising the step of:

(d) attenuating the outgoing signal, thereby reducing the echo to a predetermined level.

3. The automatic gain control method of claim 2, wherein:

the communication system also has an echo canceler canceling the echo remaining in the outgoing signal after said step (d); and said step (d) multiplies the outgoing signal by a second gain set according to the first gain.

4. The automatic gain control method of claim 3, wherein the second gain is inversely proportional to the first gain.

5. The automatic gain control method of claim 1, wherein the communication system also has an echo canceler that generates an echo replica from the incoming signal before amplification in said step (c), and removes the echo from the outgoing signal by subtracting the echo replica, further comprising the steps of:

(e) amplifying the echo replica before subtraction from the outgoing signal; and (f) attenuating the outgoing signal, after subtraction of the amplified echo replica, for feedback to the echo canceler.

6. The automatic gain control method of claim 5, wherein:

said step (e) multiplies the echo replica by a first factor proportional to the first gain; and said step (f) multiplies the outgoing signal by a second factor inversely proportional to the first gain.

7. The automatic gain control method of claim 1, wherein the communication system also has an echo canceler that generates an echo replica from the incoming signal after amplification in said step (c), and removes the echo from the outgoing signal by subtracting the echo replica, further comprising the steps of:

(g) amplifying the outgoing signal by a second gain, before subtraction of the echo replica;

(h) amplifying the echo replica before subtraction from the outgoing signal; and (i) attenuating the outgoing signal, after subtraction of the amplified echo replica, for feedback to the echo canceler.

8. The automatic gain control method of claim 7, wherein:

said step (h) multiplies the echo replica by a first factor proportional to the second gain; and said step (i) multiplies the outgoing signal by a second factor inversely proportional to the second gain.

9. The automatic gain control method of claim 1, wherein the communication system also has an echo canceler that generates an echo replica from the incoming signal after amplification in said step (c), and removes the echo from the outgoing signal by subtracting the echo replica, further comprising the steps of:

(j) amplifying the outgoing signal by a second gain, before subtraction of the echo replica;

(k) amplifying the echo replica by the second gain before subtraction from the outgoing signal; and (l) subtracting the echo replica, before amplification in said step (k), from the outgoing signal, before amplification in said step (j), to obtain a feedback signal for input to the echo canceler.

10. An automatic gain control apparatus for use in a communication system having a bi-directional two-wire line, a four-wire line with an incoming path carrying an incoming signal and an outgoing path carrying an outgoing signal, and an interface circuit electrically coupling the two-wire line to the four-wire line, comprising:

a first amplifying unit inserted in the incoming path, amplifying the incoming signal for transmission through the interface circuit to the two-wire line;

a measurement unit measuring respective levels of the incoming signal on the incoming path and an echo of the incoming signal reflected by the interface circuit onto the outgoing path, thereby determining an echo return loss; and a gain control unit coupled to the first amplifying unit and the measurement unit, calculating a first gain from the echo return loss, setting the first amplifying unit to the first gain, thereby causing the first amplifying unit to compensate for the echo return loss, so that the incoming signal reaching the two-wire line has a desired level.

11. The automatic gain control apparatus of claim 10, further comprising a second amplifying unit inserted in the outgoing path, wherein the gain control unit also calculates a second gain and sets the second amplifying unit to the second gain, thereby reducing the echo to a predetermined level.

12. The automatic gain control apparatus of claim 11, wherein:

the communication system also has an adaptive filter coupled to the incoming path at a first point and to the outgoing path at a second point, generating an echo replica from the incoming signal, with feedback of the outgoing signal;

the communication system also has a subtractor inserted in the outgoing path between the second amplifying unit and the second point, subtracting the echo replica from the outgoing signal to cancel the echo;

the first amplifying unit is disposed between the first point and the interface circuit;

the second amplifying unit is disposed between the interface circuit and the subtractor; and the gain control unit sets the second gain according to the first gain.

13. The automatic gain control apparatus of claim 12, wherein the gain control unit makes the second gain inversely proportional to the first gain.

14. The automatic gain control apparatus of claim 10, wherein the communication system also has an adaptive filter coupled to the incoming path at a first point and to the outgoing path at a second point, generating an echo replica from the incoming signal, and a subtractor inserted in the outgoing path between the interface circuit and the second point, subtracting the echo replica from the outgoing signal to cancel the echo, the first amplifying unit being disposed between the first point and the interface circuit, further comprising:

a replica amplifying unit inserted between the adaptive filter and the subtractor, controlled by the gain control unit, amplifying the echo replica for input to the subtractor; and a feedback amplifying unit inserted between the second point and the adaptive filter, controlled by the gain control unit, attenuating the outgoing signal for feedback to the adaptive filter.

15. The automatic gain control apparatus of claim 14, wherein the gain control unit sets the replica amplifying unit to a second gain proportional to the first gain, and sets the feedback amplifying unit to a third gain inversely proportional to the first gain.

16. The automatic gain control apparatus of claim 10, wherein the communication system also has an adaptive filter coupled to the incoming path at a first point and to the outgoing path at a second point, generating an echo replica, and a subtractor inserted in the outgoing path between the interface circuit and the second point, subtracting the echo replica from the outgoing signal to cancel the echo, the first point being disposed between the first amplifying unit and the interface circuit, further comprising:

a second amplifying unit inserted in the outgoing path between the interface circuit and the subtractor, controlled by the gain control unit, operating with a second gain;

a replica amplifying unit inserted between the adaptive filter and the subtractor, controlled by the gain control unit, amplifying the echo replica for input to the subtractor; and a feedback amplifying unit inserted between the second point and the adaptive filter, controlled by the gain control unit, attenuating the outgoing signal for feedback to the adaptive filter.

17. The automatic gain control apparatus of claim 16, wherein the gain control unit sets the replica amplifying unit to a third gain proportional to the second gain, and sets the feedback amplifying unit to a fourth gain inversely proportional to the second gain.

18. The automatic gain control apparatus of claim 10, wherein the communication system also has an adaptive filter coupled to the incoming path at a point between the first amplifying unit and the interface circuit, generating an echo replica from the incoming signal, and a first subtractor inserted in the outgoing path, subtracting the echo replica from the outgoing signal to cancel the echo, further comprising:

a second amplifying unit inserted in the outgoing path between the interface circuit and the subtractor, controlled by the gain control unit, operating with a second gain;

a replica amplifying unit inserted between the adaptive filter and the first subtractor, controlled by the gain control unit, operating with the second gain, amplifying the echo replica for input to the first subtractor; and a second subtractor coupled to the adaptive filter and to a point on the outgoing path disposed between the interface circuit and the second amplifying unit, subtracting the echo replica from the outgoing signal, thereby obtaining a feedback signal for input to the adaptive filter.

\* \* \* \* \*